United States Patent
Kaufman et al.

(10) Patent No.: US 6,256,099 B1
(45) Date of Patent: Jul. 3, 2001

(54) METHODS AND SYSTEM FOR MEASURING THREE DIMENSIONAL SPATIAL COORDINATES AND FOR EXTERNAL CAMERA CALIBRATION NECESSARY FOR THAT MEASUREMENT

(76) Inventors: Frederick Kaufman, 1937 Pendrell Str., Suite 403, Vancouver, B.C. (CA), V5X 1R3; Jeffrey Brian Chow, 230 E 56th Ave, Vancouver, B.C. (CA), V5X 1R3; Robert Newton James, 2060 Bellwood, Burnaby, B.C. (CA), V5B 4V2; Curtis Earle Lang, deceased, late of North Vancouver (CA), by Gordon Emery Cornwall, executor ( * ) Notice: Subject to any disclaimer, the term of this patent is extended or adjusted under 35 U.S.C. 154(b) by 0 days.

(21) Appl. No.: 09/426,319

(22) Filed: Oct. 25, 1999

(30) Foreign Application Priority Data

Nov. 6, 1998 (CA) .................................................. 2253085

(51) Int. Cl.⁷ .................................................. G01B 11/24
(52) U.S. Cl. .................................................. 356/376
(58) Field of Search .......................... 356/376; 382/106, 382/108, 152–154, 285, 291, 294, 1; 351/212, 247, 211

(56) References Cited

U.S. PATENT DOCUMENTS

| 5,193,120 | * | 3/1993 | Gamache et al. | 382/1 |
| 5,589,942 | * | 12/1996 | Gordon . | |
| 5,852,672 | * | 10/1998 | Lu | 382/154 |
| 5,886,767 | * | 3/1999 | Snook . | |

* cited by examiner

Primary Examiner—Frank G. Font
Assistant Examiner—Tu T. Nguyen
(74) Attorney, Agent, or Firm—Frederick Kaufman

(57) ABSTRACT

The present invention relates to methods and system for measuring three dimensional spatial coordinates and for external camera calibration necessary for that measurement. A simple pattern of light is projected onto a surface and used as a photogrammetric target. Images of the simple pattern are captured by two or more cameras, and processed by a computer provided with software using conventional algorithms to identify homologous points. Either, these points are used to calculate the external calibration of the cameras, or they are used in conjunction with previously calculated external camera calibration in order to calculate three dimensional spatial coordinates on the surface of an object to be measured.

8 Claims, 2 Drawing Sheets

METHODS AND SYSTEM FOR MEASURING THREE DIMENSIONAL SPATIAL COORDINATES AND FOR EXTERNAL CAMERA CALIBRATION NECESSARY FOR THAT MEASUREMENT

FIELD OF THE INVENTION

The present invention refers, in general, to methods and systems for videogrammetry and, in particular, to methods and a system for measuring three-dimensional spatial coordinates and for external camera calibration required for that measurement.

BACKGROUND OF THE INVENTION

There is a known method in photogrammetry for analyzing two-dimensional images, captured on photographic film, to produce three-dimensional coordinate measurements. At least two images of an overlapping surface portion are required. Modern photogrammetry has incorporated computers to carry out many of its functions, but the process has not yet been entirely automated. Videogrammetry has added two major improvements to the art of photogrammetry. Firstly, rather than recording images on film it records images directly on opto-electronic imaging devices, such as photosensitive diodes or other imaging surfaces. And secondly, since the images are immediately digitized and stored in a computer, they are readily accessible to manipulation and analysis by computational methods.

Attempts have been made to develop better systems and methods for measuring three-dimensional spatial coordinates. For example, U.S. Pat. No. 5,589,942 dated Dec. 31, 1996, granted to Gordon, for a "Real time three dimensional sensing system" discloses a system which utilizes two flexibly located cameras for receiving and recording visual information with respect to a sensed object illuminated by a series of light planes. Each pixel of each image is converted to a digital word and the words are grouped into stripes, each stripe comprising contiguous pixels. One pixel of each stripe in one image is selected and an epi-polar line of that point is drawn in the other image. The three dimensional coordinate of each selected point is determined by establishing the point on said epi-polar line which also lies on a stripe in the second image and which is closest to a known light plane. This system uses a complex pattern of projected stripes, which creates difficulties in finding homologous points in the pair of images, and leads to false positives and false negatives in homologous point identification. The system requires the light plane to be known.

U.S. Pat. No. 4,627,734, dated Dec. 9, 1986, granted to Rioux, for a "Three dimensional imaging device and method" discloses a three-dimensional imaging system operating in accordance with the known active triangulation method, and employing a laser beam that is projected onto an area of the surface to be examined. The solution is characterized by synchronized scanning of projected and deflected beams. The main disadvantage of the system consists in the fact that the position and orientation of the projected light beam must be known in order to calculate three dimensional coordinates.

U.S. Pat. No. 5,440,392 dated Aug. 8, 1995, granted to Pettersen et al. for a "Method and system for point by point measurement of spatial coordinates" describes a technical solution for point by point measurement of spatial coordinates. A touch probe, including three point-sized light sources at known local coordinates, touches the point to be measured. Using a camera to acquire an image of the three light sources, the system calculates the three dimensional coordinates of the point touched. It is obvious that this solution requires physically touching the object to be measured and is time-consuming.

SUMMARY OF THE INVENTION

There is accordingly a need for a method and system which overcome, or at least alleviate, the disadvantages of the prior art. It is therefore desirable to offer a technical solution which is faster, non-contact, and calibrated quickly and easily, without the use of special equipment.

Broadly, the method of measuring three-dimensional spatial coordinates starts by synchronizing at least two cameras so that they can capture simultaneous images. Then the cameras are set up with the object to be measured in their fields of view. A simple pattern is then projected onto the surface of the object, and simultaneous images which include the projected pattern are captured. The images are processed by a computer, which uses conventional software algorithms to find the pattern images, calculate centroids from the pattern images, group the centroids into homologous pairs, and calculate three-dimensional spatial coordinates.

In one aspect of the above method, wherein the projected simple pattern is a spot, images are discarded and recaptured, if necessary, until there is just one centroid in each camera image. Therefore, grouping these centroids into a homologous pair is trivial.

In another aspect of the above method, wherein the projected simple pattern is a stripe, it is necessary to segment the stripe images into sets of continuous stripe images. In one camera image, each continous stripe image is sampled at a known interval, and a centroid is calculated across the stripe for each sample, yielding a series of two dimensional points in the camera image. For each point in the series, the known internal and external calibrations of both cameras are used to determine a corresponding two-dimensional point on a stripe within the other camera image. Each such pair of corresponding points are grouped as a homologous pair.

Generally, the method of external camera calibration starts by synchronizing at least two cameras, so that they capture simultaneous images. Then, the cameras are placed so that their fields of view include a surface that will be used for calibration, and a simple pattern is projected onto that surface. A pair of simultaneous images of the simple pattern are captured. The images are processed by a computer, which uses conventional software algorithms to find the pattern images, to discard any images in which the pattern is not found, to calculate centroids of the pattern images, and to group the centroids into homologous pairs. Then, the pattern is projected onto a different portion of the surface, and new images are captured and processed, until the required number of homologous pairs have been found. The computer uses software for the methods of resection and ray bundle adjustment, known in photogrammetry, to compute an external calibration, with relative scale, of the positions and orientations of the cameras. Then, the system is used to acquire three-dimensional spatial coordinates from the surface of a target object of known dimensions. From this, a ratio is calculated and applied to the external calibration, in order to transform the relative scale into a usable absolute scale.

Broadly, the system used to carry out the above methods comprises a computer provided with software to execute the methods, at least two cameras containing image planes divided into a multiplicity of photosensitive sites, and a light projector capable of projecting a simple pattern onto a surface. Simultaneously exposed images of the simple pattern are captured and stored in computer memory.

Alternatively, the system can use charge couple devices, charge injection devices, or complementary metal-oxide semiconductors for image planes.

Alternatively, the system can use a light projector that is hand-held or coupled to a computer-controlled electromechanical beam positioner.

Alternatively, the system can use a light projector that is a laser device, a light-emitting diode (LED) device, or a light projector using focussing optics to project an image onto an external surface.

Alternatively, the system can use a light projector that uses collimating or focussing optics.

DESCRIPTION OF PREFERRED EMBODIMENTS

Figure 1:
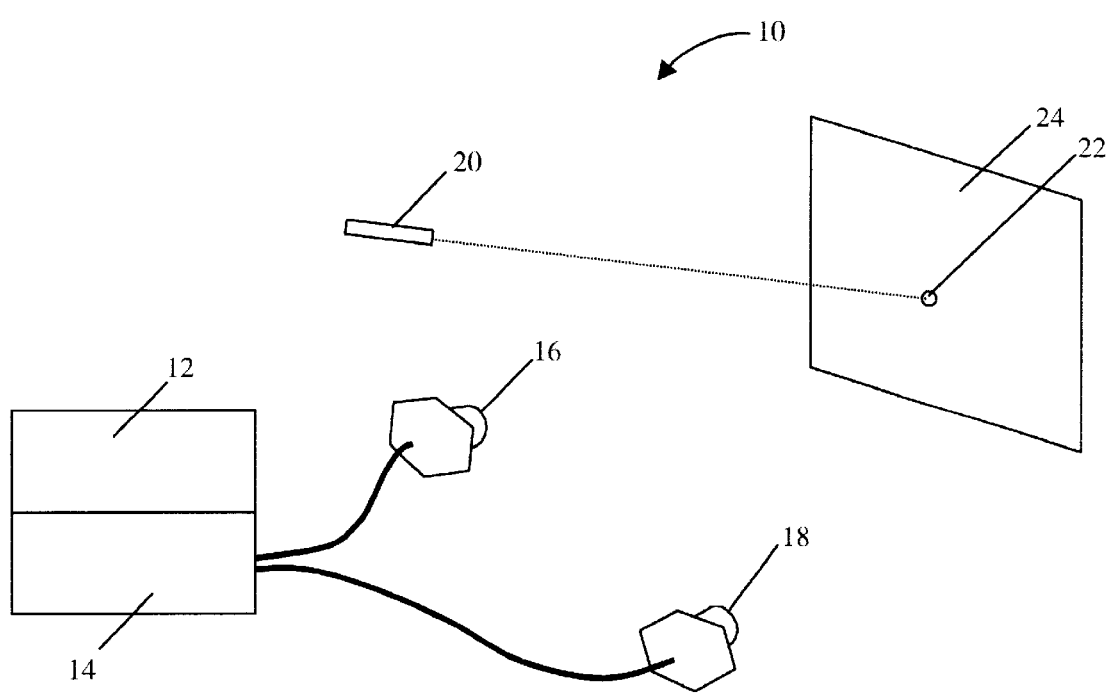
FIG. 1 depicts the system for carrying out the present invention.

Referring now to the accompanying FIG. 1, there is depicted a system for measuring three-dimensional spatial coordinates and for external camera calibration 10, which comprises a computer 12 with image capture electronics boards 14 to which are connected two cameras 16 and 18. Alternatively, more cameras may be added, if required, for more complete coverage of the surface. A light projector 20 is used to project a simple pattern 22, such as a small spot of which the image approximates a point light source, onto a surface 24. Alternatively, simple pattern 22 may be a larger spot, of which the image is a disk, or it may be a stripe. Simultaneously-exposed images of projected simple pattern 22 are produced by cameras 16 and 18, then captured by image capture electronics boards 14, and finally stored in the memory of computer 12. Computer 12 is provided with software to control cameras 16 and 18 and to process and analyze the images. Cameras 16 and 18 contain imaging surfaces, which are charge-couple devices (CCD). The imaging surfaces are divided into a multiplicity of photosensitive sites.

Alternatively, cameras 16 and 18 may contain imaging surfaces which are charge injection devices (CID) or complementary metal-oxide semiconductor (CMOS) devices.

Light projector 20 is hand-held. Alternatively, light projector 20 is coupled to a computer-controlled electromechanical beam positioner capable of altitude/azimuth movement.

Light projector 20 is a laser device. Alternatively, light projector 20 is a light-emitting diode (LED) device or a slide projector.

Light projector 20 uses a coherent light source. Alternatively, light projector 20 can use an incoherent light source.

Light projector 20 uses collimating optics. Alternatively, light projector 20 can use focussing optics.

In the case of a laser or LED device, beam forming optics that expand the light in the shape of a flat fan can be used.

In the case of a slide projector, the slide comprises an opaque mask surrounding a transparent pattern which is one of the above-mentioned three simple patterns: a small spot, a larger spot, or a stripe.

The components of the system mentioned in the above description are of conventional type and are readily available.

The system described above is used to measure three-dimensional spatial coordinates as follows: Cameras 16 and 18 are synchronized in order to capture simultaneous images. Then, cameras 16 and 18, kept in a fixed relationship, are directed towards the surface of an object to be measured. Then, a simple pattern is projected onto a portion of the surface of the object, which portion is in the field of view of both cameras 16 and 18. Image capture electronics boards 14 are used to capture simultaneous images of the projected simple pattern in cameras 16 and 18. Computer 12 is provided with software, using conventional algorithms, to perform the following operations:

images of the projected pattern are found within the captured images;

if images of the pattern are not found within both camera images, the camera images are discarded, the pattern is moved, and new images are captured;

centroids of the projected pattern on the image planes of cameras 16 and 18 are calculated;

the above-calculated centroids are grouped into homologous pairs (a pair of centroids is homologous if they are centroids of two images of the same portion of the same simple pattern), and three-dimensional coordinates are calculated from each homologous pair of centroids, internal and external camera calibrations being known.

Some of the above operations differ depending on the type of projected simple pattern.

If the projected simple pattern is a spot, the above operations, except the first and the last, are replaced by the following:

the camera images are discarded and new ones captured, if images of the pattern are not found within both camera images, or if multiple images of the pattern are found within a single camera image;

two-dimensional centroids are calculated, for the images of the spot, on the image planes of cameras 16 and 18, and the resulting centroids are grouped as a homologous pair.

If the projected simple pattern is a stripe, the above operations, except the first and the last, are replaced by the following:

the stripe image within each camera image is segmented into a set of one or more continuous stripe images;

in one camera image, one-dimensional centroids are calculated across each continous stripe image at a known sampling interval, which yields a series of two-dimensional points on the image plane;

for each two-dimensional point in the series, a corresponding two-dimensional point on a stripe image in the other camera image is found, using the known internal and external camera calibrations, and each such pair of corresponding two-dimensional points is grouped as a homologous pair.

An external camera calibration determines the positions and orientations of the cameras. The external camera calibration, along with the already-established internal camera calibration and the homologous pairs, mentioned above, is necessary for using the system to calculate three-dimensional spatial coordinates, as described above. To perform external camera calibration, the system, in the case where the simple pattern is a spot, is used as follows:

1. Cameras 16 and 18 are synchronized in order to capture simultaneous images and are directed independently towards a surface used for calibration.

2. A simple spot pattern is projected onto a portion of the said surface used for calibration, which portion is located in the field of view of both cameras 16 and 18.

3. A pair of images of the projected simple pattern is captured simultaneously.

4. Computer 12 is provided with software, using conventional algorithms, to perform the following operations:

images of the projected pattern within the captured images are found; if no images of the pattern are found, or multiple images of the pattern are found within a camera image, the camera images are discarded, the projected pattern is moved, and new camera images are captured;

centroids of the projected pattern, on the image planes of cameras 16 and 18, are calculated;

the above-calculated centroids are grouped into homologous pairs;

5. Operations 2 to 4 are repeated, so as to obtain at least three homologous pairs of centroids derived from projecting the simple pattern onto different portions of the surface used for calibration.

6. Computer 12, provided with software, applies the methods of resection and ray bundle adjustment, known in photogrammetry, to calculate a partial external calibration, with an unknown absolute scale, of the positions and orientations of cameras 16 and 18.

7. An absolute scale is determined by using the system to measure a target of known dimensions, then establishing the ratio between measured dimensions and known dimensions, and applying that ratio to the already-calculated partial external calibration.

Figure 2:
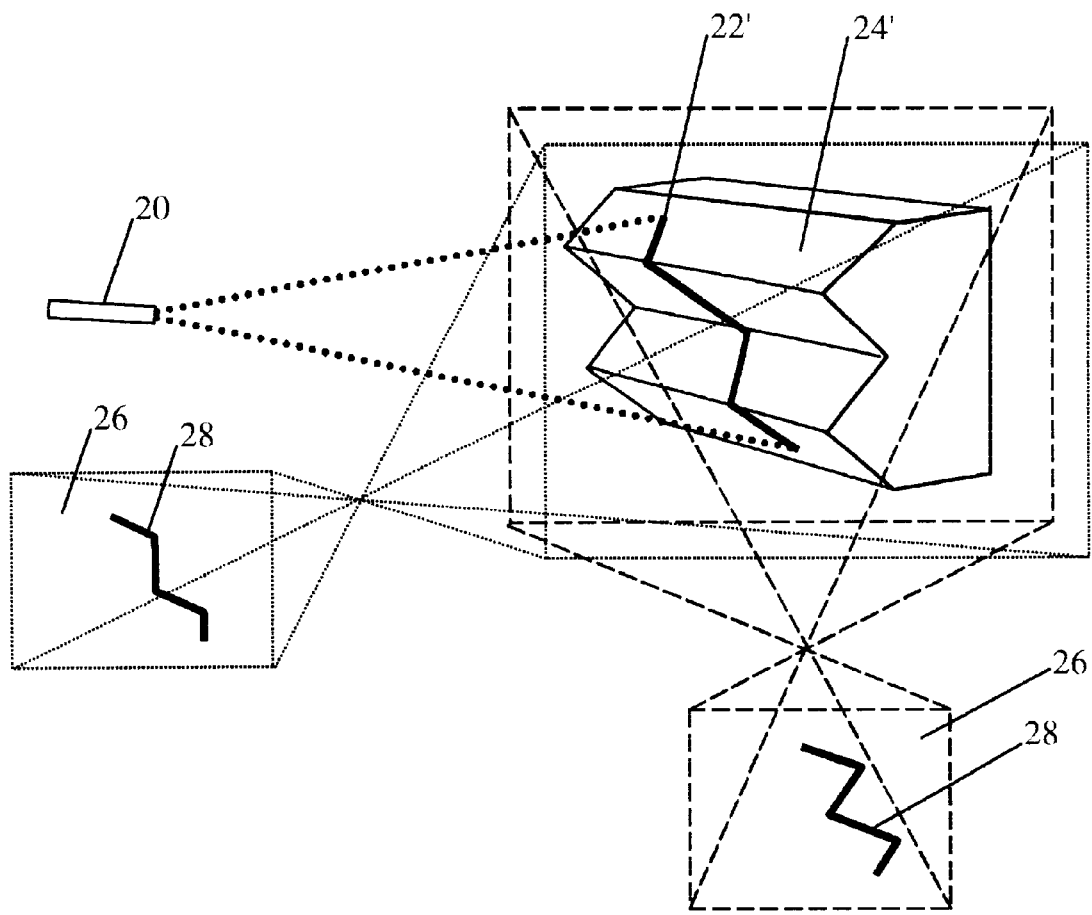
FIG. 2 depicts the use of a projected stripe for external camera calibration.

In the case where the simple pattern is a stripe, the system is used as follows (FIG. 2):

1. Cameras 16 and 18 are synchronized in order to capture simultaneous images and are directed independently towards a surface used for calibration 24'.

2. Surface used for calibration 24' comprises planes that intersect so that their lines of intersection are in the fields of view of cameras 16 and 18.

3. A simple pattern 22', which in this case is a stripe, is projected onto a portion of surface used for calibration 24', which portion is located in the field of view of both cameras 16 and 18, so that the stripe crosses the said lines of intersection.

4. A pair of camera images 26 containing projected simple pattern 22' is captured simultaneously.

5. Computer 12 is provided with software, using conventional algorithms, to perform the following operations:

a pair of stripe images 28 of projected simple pattern 22', within pair of camera images 26, already captured, are found; if no images of projected simple pattern 22' are found, or multiple images of projected simple pattern 22' are found within either one of pair of camera images 26, that pair of camera images 26 is discarded, then projected simple pattern 22' is moved, and a new pair of camera images 26 is captured;

in camera images 26, one-dimensional centroids are calculated across each image of the pair of stripe images 28, at a known sampling interval, which yields a series of two-dimensional points on the image plane;

each stripe image of the pair of stripe images 28 is divided into straight-line segments;

the intersection points of adjoining straight-line segments are found in both of the pair of stripe images 28;

the found intersection points are grouped into homologous pairs, in order, from top to bottom of each image;

6. If the necessary minimum number of homologous pairs of intersection points is not obtained, projected simple pattern 22' is moved to a new position on surface used for calibration 24' and operations 3 to 5 are repeated.

7. Computer 12, provided with software, applies the methods of resection and ray bundle adjustment, known in photogrammetry, to calculate a partial external calibration, with an unknown absolute scale, of the positions and orientations of cameras 16 and 18.

8. An absolute scale is determined by using the system to measure a target of known dimensions, then establishing the ratio between measured dimensions and known dimensions, and applying that ratio to the already-calculated partial external calibration.

At this stage the external calibration is complete, and the system can be used to measure three-dimensional spatial coordinates.

The system and its uses, described above, are based on the same inventive concept, which consists in projecting a simple pattern to generate homologous points for use with standard photogrammetric techniques.

The embodiments of the invention in which an exclusive property or privilege is claimed are defined as follows:

1. Method of measuring three-dimensional spatial coordinates, comprising the following operational steps:

A. synchronizing at least two cameras in order to capture simultaneous images;

B. directing said cameras, kept in a fixed relationship, towards the surface of an object to be measured;

C. projecting a simple pattern onto a portion of the surface of said object, which portion is in the field of view of said cameras;

D. capturing simultaneous images of said projected simple pattern in said cameras;

E. using a computer, provided with software, using conventional algorithms, for:

1. finding images of said projected simple pattern within said captured images;

2. discarding said captured images and capturing new ones if images of said pattern are not found within said captured images;

3. calculating centroids of said projected simple pattern on image planes of said cameras;

4. grouping said calculated centroids into homologous pairs, and 5. calculating three-dimensional coordinates from each of said homologous pairs of centroids, internal and external camera calibrations being known.

2. Method of measuring three-dimensional spatial coordinates, as defined in claim 1, wherein the steps of discarding, calculating and grouping are replaced, in the case where said projected simple pattern is a spot, by the following:

A. discarding said captured images and capturing new ones if images of the pattern are not found within both camera images, or if multiple images of said spot are found within a single captured image;

B. calculating two-dimensional centroids for the images of said spot on the image planes of said cameras; and C. grouping the resulting centroids as a homologous pair.

3. Method of measuring three-dimensional spatial coordinates, as defined in claim 1, wherein the steps of calculating and grouping are replaced, in the case where said projected simple pattern is a stripe, by the following:

A. segmenting said images of said projected simple pattern, which in this case is a stripe, into sets of one or more continuous stripe images;

B. calculating, in one camera image, a plurality of one-dimensional centroids across each continous stripe image at a known sampling interval, which yields a series of two-dimensional points in said camera image;

C. determining, for each two-dimensional point in said series, a corresponding two-dimensional point on a stripe image in the other camera image, internal and external camera calibrations being known; and D. grouping each such pair of corresponding two-dimensional points as a homologous pair.

4. Method of external camera calibration, comprising the following operational steps:

A. synchronizing at least two cameras in order to capture simultaneous images;

B. directing said cameras towards a surface used for calibration;

C. projecting a simple pattern onto a portion of said surface used for calibration, which portion is in the field of view of said cameras;

D. capturing a pair of simultaneous images of said projected simple pattern;

E. using a computer, provided with software, using conventional algorithms, for:
 1. finding images of said projected simple pattern within said pair of captured images;
 2. discarding said captured images and capturing new ones if images of said pattern are not found within said captured images;
 3. calculating centroids of the projected pattern on the image planes of said cameras;
 4. grouping said calculated centroids into homologous pairs;

F. repeating steps C to E so as to obtain at least three homologous pairs of centroids derived from projecting said simple pattern onto different portions of said surface used for calibration;

G. using said computer, provided with software for photogrammetric resection and ray bundle adjustment to compute an external calibration, with relative scale, of the positions and orientations of said cameras, and H. transforming said relative scale to a usable absolute scale by employing the system to measure a target of known dimensions, by establishing the ratio between measured dimensions and known dimensions, and by applying that ratio to the external calibration.

5. System for carrying out a method for measuring three-dimensional spatial coordinates, which method comprises the following operational steps:

A. synchronizing at least two cameras in order to capture simultaneous images;

B. directing said cameras, kept in a fixed relationship, towards the surface of an object to be measured;

C. projecting a simple pattern onto a portion of the surface of said object, which portion is in the field of view of said cameras;

D. capturing simultaneous images of said projected simple pattern in said cameras;

E. using software, employing conventional algorithms, for:
 1. finding images of said projected simple pattern within said captured images;
 2. discarding said captured images and capturing new ones if images of said pattern are not found within said captured images;
 3. calculating centroids of said projected simple pattern on image planes of said cameras;
 4. grouping said calculated centroids into homologous pairs, and
 5. calculating three-dimensional coordinates from each of said homologous pairs of centroids, internal and external camera calibrations being known;

said system for carrying out said method for measuring three-dimensional spatial coordinates including:

I. a light projector used to project a simple pattern onto a surface;

II. at least two cameras containing image planes divided into a multiplicity of photo-sensitive sites for capturing images; whereby said cameras capture simultaneously exposed images of said projected simple pattern, said images being transformed and stored in a memory of the system;

III. data processing means, using conventional algorithms, for carrying out said operational step E of said method for measuring three-dimensional spatial coordinates.

6. System for carrying out a method for measuring three-dimensional spatial coordinates, which method comprises the following operational steps:

A. synchronizing at least two cameras in order to capture simultaneous images;

B. directing said cameras, kept in a fixed relationship, towards the surface of an object to be measured;

C. projecting a simple pattern in the form of a spot onto a portion of the surface of said object, which portion is in the field of view of said cameras;

D. capturing simultaneous images of said simple pattern in the form of a spot in said cameras;

E. using software, employing conventional algorithms, for:
 1. finding images of said simple pattern in the form of a spot within said captured images;
 2. discarding said captured images and capturing new ones, if images of said simple pattern in the form of a spot are not found within both camera images, or if multiple images of said simple pattern in the form of a spot are found within a single captured image;
 3. calculating two-dimensional centroids for the images of said simple pattern in the form of a spot on the image planes of said cameras;
 4. grouping the resulting centroids as a homologous pair; and
 5. calculating three-dimensional coordinates from each of said homologous pairs of centroids, internal and external camera calibrations being known;

said system for carrying out said method for measuring three-dimensional spatial coordinates including:

I. a light projector used to project a simple pattern in the form of a spot onto a surface;

II. at least two cameras containing image planes divided into a multiplicity of photo-sensitive sites for capturing images; whereby said cameras capture simultaneously exposed images of said projected simple pattern, said images being transformed and stored in a memory of the system;

III. data processing means, using conventional algorithms, for carrying out said operational step E of said method for measuring three-dimensional spatial coordinates.

7. System for carrying out a method for measuring three-dimensional spatial coordinates, which method comprises the following operational steps:
   A. synchronizing at least two cameras in order to capture simultaneous images;
   B. directing said cameras, kept in a fixed relationship, towards the surface of an object to be measured;
   C. projecting a simple pattern in the form of a stripe onto a portion of the surface of said object, which portion is in the field of view of said cameras;
   D. capturing simultaneous images of said simple pattern in the form of a stripe in said cameras;
   E. using software, employing conventional algorithms, for:
      1. finding images of said simple pattern in the form of a stripe within said captured images;
      2. discarding said captured images and capturing new ones, if images of said simple pattern in the form of a stripe are not found within both camera images, or if multiple images of said simple pattern in the form of a stripe are found within a single captured image;
      3. segmenting said images of said projected simple pattern, which in this case is a stripe, into sets of one or more continuous stripe images;
      4. calculating, in one camera image, a plurality of one-dimensional centroids across each continous stripe image at a known sampling interval, which yields a series of two-dimensional points in said camera image;
      5. determining, for each two-dimensional point in said series, a corresponding two-dimensional point on a stripe image in the other camera image, internal and external camera calibrations being known;
      6. grouping each such pair of corresponding two-dimensional points as a homologous pair; and
      7. calculating three-dimensional coordinates from each of said homologous pairs of centroids, internal and external camera calibrations being known;
   said system for carrying out said method for measuring three-dimensional spatial coordinates including:
   I. a light projector used to project a simple pattern in the form of a stripe onto a surface;
   II. at least two cameras containing image planes divided into a multiplicity of photo-sensitive sites for capturing images; whereby said cameras capture simultaneously exposed images of said projected simple pattern, said images being transformed and stored in a memory of the system;
   III. data processing means, using conventional algorithms, for carrying out said operational step E of said method for measuring three-dimensional spatial coordinates.

8. System for carrying out a method for external camera calibration, which method comprises the following operational steps:
   A. synchronizing at least two cameras in order to capture simultaneous images;
   B. directing said cameras towards a surface used for calibration;
   C. projecting a simple pattern onto a portion of said surface used for calibration, which portion is in the field of view of said cameras;
   D. capturing a pair of simultaneous images of said projected simple pattern;
   E. using software, employing conventional algorithms, for:
      1. finding images of said projected simple pattern within said pair of captured images;
      2. discarding said captured images and capturing new ones if images of said projected simple pattern are not found within said captured images;
      3. calculating centroids of said projected simple pattern on the image planes of said cameras;
      4. grouping said calculated centroids into homologous pairs;
   F. repeating steps C to E so as to obtain at least three said homologous pairs of centroids derived from projecting said simple pattern onto different portions of said surface used for calibration;
   G. computing an external calibration, with relative scale, of the positions and orientations of said cameras, using methods of photogrammetric resection and ray bundle adjustment, and
   H. transforming said relative scale to a usable absolute scale by employing the system to measure a target of known dimensions, by establishing the ratio between measured dimensions and known dimensions, and by applying that ratio to the external calibration.
   said system including:
   I. a light projector used to project a simple pattern onto a surface used for calibration;
   II. at least two cameras containing image planes divided into a multiplicity of photo-sensitive sites for capturing images; whereby said cameras capture simultaneously exposed images of said projected simple pattern, said images being transformed and stored in a memory of the system;
   III. data processing means, using conventional algorithms, for carrying out said operational steps E and G of said method for external camera calibration.

* * * * *

UNITED STATES PATENT AND TRADEMARK OFFICE
CERTIFICATE OF CORRECTION

PATENT NO. : 6,256,099 B1
DATED : July 3, 2001
INVENTOR(S) : Kaufman et al.

It is certified that error appears in the above-identified patent and that said Letters Patent is hereby corrected as shown below:

<u>Title page,</u>
Item [12] "Kaufman et al." should read as -- Chow et al --; and Item [76] Inventors: delete "Frederick Kaufman, 1937 Pendrell Str., Suite 403, Vancouver, B.C. (CA), V5X 1R3 ; --.

Signed and Sealed this

Eleventh Day of December, 2001

Attest:

*Nicholas P. Godici*

NICHOLAS P. GODICI
*Attesting Officer*   *Acting Director of the United States Patent and Trademark Office*